(12) United States Patent
Ihara et al.

(10) Patent No.: US 10,563,861 B2
(45) Date of Patent: Feb. 18, 2020

(54) PROCESS SYSTEM MANAGEMENT SYSTEM, SERVER APPARATUS, MANAGEMENT PROGRAM, AND MANAGEMENT METHOD

(71) Applicant: TLV Co., Ltd., Kakogawa-shi (JP)

(72) Inventors: Kenta Ihara, Kakogawa (JP); Yoshio Miyamae, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 234 days.

(21) Appl. No.: 15/107,244

(22) PCT Filed: Nov. 18, 2014

(86) PCT No.: PCT/JP2014/080486
§ 371 (c)(1),
(2) Date: Jun. 22, 2016

(87) PCT Pub. No.: WO2015/098364
PCT Pub. Date: Jul. 2, 2015

(65) Prior Publication Data
US 2017/0122551 A1    May 4, 2017

(30) Foreign Application Priority Data

Dec. 25, 2013  (JP) .................................. 2013-268145
Jun. 25, 2014  (JP) .................................. 2014-130130

(51) Int. Cl.
*F22B 37/38* (2006.01)
*F16T 1/48* (2006.01)
(Continued)

(52) U.S. Cl.
CPC ................ *F22B 37/38* (2013.01); *F16T 1/48* (2013.01); *F22B 35/00* (2013.01); *F22B 37/42* (2013.01);
(Continued)

(58) Field of Classification Search
CPC .. F22B 37/38; F22B 37/42; F16T 1/48; G06F 17/30554; G06F 17/30864
(Continued)

(56) References Cited

U.S. PATENT DOCUMENTS 5,463,730 A * 10/1995 Hatada .................. G06F 3/0481
715/810
6,247,128 B1 * 6/2001 Fisher ........................ G06F 8/63
713/1
(Continued)

FOREIGN PATENT DOCUMENTS

EP  1914688 A1  4/2008
EP  2375391 A1  10/2011
(Continued)

*Primary Examiner* — Janet L Suglo
*Assistant Examiner* — Douglas Kay
(74) *Attorney, Agent, or Firm* — The Webb Law Firm

(57) ABSTRACT

A management system includes a map information storage unit, an association information storage unit, a map information generation unit, a display unit, and an operation unit. The map information generation unit generates display arrangement map information and display process map information for displaying an arrangement map that indicates arrangement positions and a process map that indicates a connection relationship of a plurality of system devices that constitute a process system. Also, the map information generation unit generates the display process map information in a display mode that enables other system devices associated with a designated system device to be identified, based on information stored in the association information storage unit.

14 Claims, 15 Drawing Sheets

(51) Int. Cl.
*F22B 35/00* (2006.01)
*G06Q 50/06* (2012.01)
*F22B 37/42* (2006.01)
*G06F 16/248* (2019.01)
*G06F 16/951* (2019.01)
*G06Q 10/00* (2012.01)
*G06Q 10/08* (2012.01)

(52) U.S. Cl.
CPC .......... *G06Q 10/087* (2013.01); *G06Q 10/20* (2013.01); *G06Q 50/06* (2013.01); *G06F 16/248* (2019.01); *G06F 16/951* (2019.01)

(58) Field of Classification Search
USPC ........................................................ 702/188
See application file for complete search history.

(56) References Cited

U.S. PATENT DOCUMENTS

| | | | | |
|---|---|---|---|---|
| 6,356,939 | B1* | 3/2002 | Dahl | G09B 5/065 348/E5.137 |
| 6,710,776 | B2* | 3/2004 | Usaki | F16T 1/48 340/525 |
| 6,774,786 | B1* | 8/2004 | Havekost | G05B 23/0272 340/500 |
| 6,980,211 | B2* | 12/2005 | Lin | G06F 17/509 345/440 |
| 7,711,813 | B1* | 5/2010 | Yehuda | G06F 3/0604 709/224 |
| 7,822,594 | B2* | 10/2010 | Haviv | G06F 8/61 703/21 |
| 8,255,090 | B2* | 8/2012 | Frader-Thompson | G01D 4/002 700/295 |
| 8,479,099 | B2* | 7/2013 | Miki | F24F 11/006 700/277 |
| 8,762,105 | B2* | 6/2014 | Fujiwara | F01K 13/006 702/184 |
| 9,060,211 | B2* | 6/2015 | Nagase | G05B 19/4183 |
| 2001/0006384 | A1* | 7/2001 | Usaki | F16T 1/48 345/204 |
| 2004/0117159 | A1* | 6/2004 | Shimizu | G05B 23/0256 702/188 |
| 2004/0260408 | A1* | 12/2004 | Scott | G05B 23/0213 700/20 |
| 2005/0007249 | A1* | 1/2005 | Eryurek | G05B 23/027 340/511 |
| 2007/0043539 | A1* | 2/2007 | Niina | G05B 23/0221 702/188 |
| 2008/0123559 | A1* | 5/2008 | Haviv | G06F 8/61 370/255 |
| 2009/0044042 | A1* | 2/2009 | Fujiwara | F01K 13/006 714/3 |
| 2009/0216495 | A1* | 8/2009 | Fujiwara | F01K 13/006 702/184 |
| 2009/0306798 | A1* | 12/2009 | Moeller | G10K 11/175 700/94 |
| 2010/0070906 | A1 | 3/2010 | Hishikawa | |
| 2011/0295561 | A1* | 12/2011 | Nagase | G05B 19/4183 702/188 |
| 2012/0259966 | A1* | 10/2012 | Ishii | H04L 41/0853 709/223 |
| 2013/0138603 | A1* | 5/2013 | Chilakamarri | G06Q 10/00 707/609 |
| 2015/0242908 | A1* | 8/2015 | Kobyakov | G06Q 30/0277 705/14.73 |

FOREIGN PATENT DOCUMENTS

| | | |
|---|---|---|
| JP | 8234830 A | 9/1996 |
| JP | 200430595 A | 1/2004 |
| JP | 201024899 A | 2/2010 |
| JP | 2010024899 A | 2/2010 |
| JP | 201071802 A | 4/2010 |
| JP | 2010146186 A | 7/2010 |
| JP | 2011118739 A | * 6/2011 |
| JP | 2011118739 A | 6/2011 |
| JP | 2013155896 A | 8/2013 |

\* cited by examiner

Fig.6A
System configuration device chart

| | | 90 |
|---|---|---|
| Identification ID | XXXX-XXXXX | |
| Next replacement time | YY/MM/DD | |
| Maintenance history | ...... | |
| Examination result | ...... | |
| ⋮ | ⋮ | |
| Associated identification IDs | KKK-KKKK, SSS-SSSS, ··· | |

Fig.6B
Basic area map data 91

| Coordinates | Identification ID | Area information |
|---|---|---|
| $(X_1, Y_1)$ | XXXX-XXXX1 | B-6 |
| $(X_2, Y_2)$ | XXXX-XXXX2 | B-6 |
| ⋮ | ⋮ | ⋮ |
| $(X_m, Y_m)$ | XXXX-XXXXX | X-X |

Fig.6C
Basic process map data 92

| Coordinates | Identification ID |
|---|---|
| $(X_1, Y_1)$ | XXXX-XXXX1 |
| $(X_2, Y_2)$ | XXXX-XXXX2 |
| ⋮ | ⋮ |
| $(X_{n-1}, Y_{n-1})$ | KKK-KKKK |
| $(X_n, Y_n)$ | SSS-SSSS |

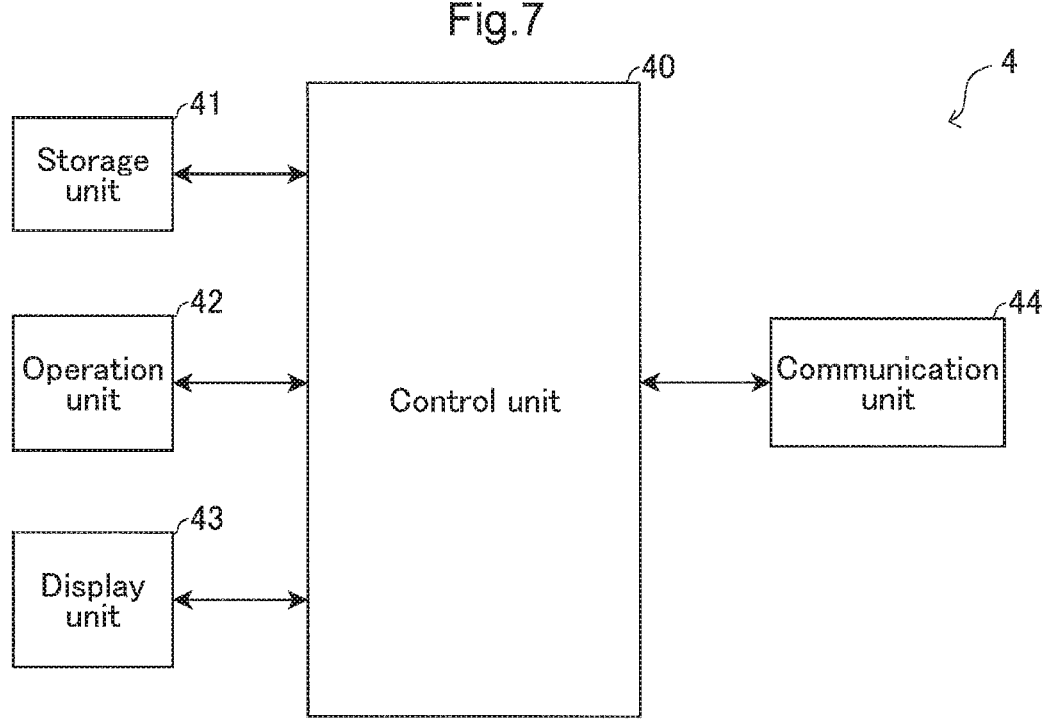

Fig.13

System configuration device chart 900

| Identification ID | XXXX-XXXXX |
|---|---|
| Next replacement time | YY/MM/DD |
| Maintenance history | ...... |
| Examination result | ...... |
| Operation state | Normal |
| ⋮ | ⋮ |
| Associated identification IDs | KKK-KKKK, SSS-SSSS, ... |

PROCESS SYSTEM MANAGEMENT SYSTEM, SERVER APPARATUS, MANAGEMENT PROGRAM, AND MANAGEMENT METHOD

CROSS-REFERENCE TO RELATED APPLICATIONS

This application is the United States national phase of International Application No. PCT/JP2014/080486 filed Nov. 18, 2014, and claims priority to Japanese Patent Application Nos. 2013-268145 and 2014-130130, filed Dec. 25, 2013 and Jun. 25, 2014, respectively, the disclosures of which are hereby incorporated in their entirety by reference.

TECHNICAL FIELD

This invention relates to a system for managing a process system that includes a plurality of system devices, a server apparatus for this management system, a program for managing this server apparatus, and a method for managing the process system.

BACKGROUND ART

A process system such as a steam supply system is used to supply steam to a steam using device in a facility such as a steam plant. The steam supply system is constituted by system devices such as a boiler or similar steam generation device, a transport pipe for transporting steam, a steam trap for discharging drainage, and a steam using device that uses steam. Steam plants are described in JP 2010-024899A and JP 2013-155896A.

In a steam supply system, drainage that is generated by condensation of a portion of steam causes problems such as a decrease in the operating efficiency of the steam using device. Therefore, drainage is discharged by arranging steam traps in strategic positions of the steam supply system. In order to maintain this drainage discharge function, the steam traps are regularly inspected and repaired, for example.

When the steam traps are inspected, an operator uses an examination device on the steam traps one by one, and investigates the steam leakage amount and the like. A steam trap with a large steam leakage amount is replaced with a normal steam trap, or the steam trap is repaired by replacing a portion of the components, for example. Alternatively, there are also cases where the steam traps are regularly replaced with new steam traps. The repair person specifies the relevant steam trap with reference to an area map in which the arrangement positions of the steam traps are depicted, and performs the repair work.

Such steam traps are installed at various positions in the steam supply system, and in the steam supply system of a huge plant or the like, tens of thousands of steam traps are installed.

PRIOR ART DOCUMENTS

Patent Documents

Patent Document 1: JP 2010-024899A
Patent Document 2: JP 2013-155896A

DISCLOSURE OF THE INVENTION

Problem to be Solved by the Invention

As described above, although steam traps with a large steam leakage amount are mainly a target for replacement or the like, there are steam traps with a low urgency for replacement depending on the association with other system devices or the like. For example, there are cases where a plurality of steam traps are connected to the same transport pipe. In this case, even if one steam trap of the plurality of steam traps needs to be replaced, the drainage discharge function can be maintained to some extent as long as the remaining steam traps excluding the one steam trap function normally, and thus replacement is not so urgent. Therefore, performing replacement work with priority given to a steam trap with a higher urgency for replacement than the one steam trap is effective in maintaining the operation efficiency of the steam supply system. However, the operator needs to be skilled at considering the association with other system devices.

An object of this invention is to provide a system for managing a process system in which the association between each of a plurality of system devices that constitute the process system and the other system devices can be easily grasped, a server apparatus for this management system, a program for managing this server apparatus, and a management method.

Means for Solving Problem

A server apparatus, provided by a first aspect of the present invention, that is configured to be applied to a system for managing a process system that includes a plurality of system devices and to be connected to a terminal apparatus via a network line in a manner that enables transmission and reception therebetween includes a map information storage unit, an association information storage unit, and a map information generation unit. The map information storage unit stores basic arrangement map information for displaying an arrangement map that indicates an arrangement position of at least a specific system device of the plurality of system devices that constitute the process system, and basic process map information for displaying a process map that indicates a connection relationship of the plurality of system devices. The association information storage unit stores association information in which identification information of other system devices associated with the specific system device is associated with identification information of the specific system configuration device. The map information generation unit generates display arrangement map information and display process map information for switching display of the arrangement map and the process map or displaying the arrangement map and the process map side by side on a display unit of the terminal apparatus, based on the basic arrangement map information and the basic process map information that are stored in the map information storage unit. Also, the map information generation unit specifies another system device associated with the system device, which is designated on an operation unit of the terminal apparatus, based on the information stored in the association information storage unit, and generates the display process map information for displaying the specified other system device in an identifiable display mode.

A configuration is possible in which the map information generation unit generates the display arrangement map information and the display process map information for also displaying the designated system device in an identifiable display mode.

A configuration is possible in which the operation unit of the terminal apparatus accepts an operation input for designating a position in the arrangement map displayed on the display unit, and the map information generation unit specifies the system device designated on the operation unit of the terminal apparatus from position information in an arrangement map transmitted from the terminal apparatus, based on the information stored in the association information storage unit.

A configuration is possible in which display of the arrangement map and the process map is switched on the display unit of the terminal apparatus, and the map information generation unit, if the position information in the arrangement map is received, generates the display process map information so as to switch display from the arrangement map that is displayed on the display unit of the terminal apparatus to the process map.

A configuration is possible in which an operation state storage unit that stores information on an operation state of the specific configuration device in association with the identification information of the specific configuration device is further included, and the map information generation unit generates the display arrangement map information and the display process map information for displaying each of operation states of the specific system device in a specifiable display mode, based on the information stored in the operation state storage unit.

A configuration is possible in which the display mode with which each of the operation states of the specific system device can be specified is such that any of a shape, a color, and a flashing interval differs in accordance with the operation state.

The specific configuration device may be a steam trap that discharges drainage generated in the process system, and the operation state may be a state determined based on information on a temperature and vibration relating to the steam trap.

The operation states of the specific configuration device may include a normal state indicating a correct operation state, an abnormal state that indicates an abnormal operation state, and an inactive state in which operation has stopped.

A system, provided by a second aspect of the present invention, for managing a process system that includes a plurality of system devices includes a map information storage unit, an association information storage unit, a map information generation unit, a display unit, and an operation unit. The map information storage unit stores basic arrangement map information for displaying an arrangement map that indicates an arrangement position of at least a specific system device of the plurality of system devices that constitute the process system, and basic process map information for displaying a process map that indicates a connection relationship of the plurality of system devices. The association information storage unit stores association information in which identification information of other system devices associated with the specific system device is associated with the identification information of the specific system configuration device. The map information generation unit generates display arrangement map information for displaying the arrangement map and display process map information for displaying the process map, based on the basic arrangement map information and the basic process map information that are stored in the map information storage unit. The display unit switches display of the arrangement map and the process map or displays the arrangement map and the process map side by side, using the display arrangement map information and the display process map information. The operation unit accepts an operation input for designating one of the specific system devices. The map information generation unit specifies another system device associated with the system device, which is designated via the operation unit, based on the information stored in the association information storage unit, and generates the display process map information for displaying the specified other system device in an identifiable display mode.

A program, provided by a third aspect of the present invention, for managing a process system causes a computer of a server apparatus that is configured to be applied to a system for managing a process system that includes a plurality of system devices and to be connected to a terminal apparatus via a network line in a manner that enables transmission and reception therebetween to function as a map information generation unit that generates display arrangement map information and display process map information for switching display of an arrangement map and a process map or displaying the arrangement map and the process map side by side on a display unit of the terminal apparatus, based on the basic arrangement map information for displaying an arrangement map that indicates the arrangement position of at least a specific system device of a plurality of system devices that constitutes the process system and the basic process map information for displaying a process map that indicates a connection relationship of the plurality of system devices, and causes the map information generation unit to function as a unit that specifies another system device associated with the system device, which is designated on an operation unit of the terminal apparatus, based on association information in which identification information of other system devices associated with the specific system device is associated with identification information of the specific system device, and generates the process map information for displaying the specified system device in an identifiable display mode.

A method, provided by the fourth aspect of the present invention, for managing a process system including a plurality of system devices that is executed by a computer includes a step of accessing a map information storage unit that stores basic arrangement map information for displaying an arrangement map that indicates an arrangement position of at least a specific system device of the plurality of system devices that constitute the process system and basic process map information for displaying a process map that indicates a connection relationship of the plurality of system devices, a step of accessing an association information storage unit that stores association information in which identification information of other system devices associated with the specific system device is associated with identification information of the specific system device, a map information generation step of generating display arrangement map information for displaying the arrangement map and display process map information for displaying the process map, based on the basic arrangement map information and the basic process map information that are stored in the map information storage unit, a display step of switching display of the arrangement map and the process map or displaying the arrangement map and the process map side by side using the display arrangement map information and the display process map information, and an operation step of accepting an operation input for designating one of the specific system devices, and in the map information generation step, another system device associated with the system device designated on the operation unit is specified based on information stored in an association information storage unit, and the display process map information for displaying the specified other system device in an identifiable display mode is generated.

Advantageous Effects of the Invention

According to this invention, in addition to an arrangement map indicating arrangement positions of system devices, a process map that enables other system devices associated with at least a specific system device to be specified can be displayed on a display unit. Therefore, a user can easily grasp the association between a target system device and other system devices. Accordingly, the user can review work priority and the like based on this association, and can efficiently maintain the operating efficiency of the process system.

BRIEF DESCRIPTION OF THE DRAWINGS

FIG. 6A is a diagram showing a system configuration device chart as an example of data stored in a storage unit of the server apparatus according to an embodiment of this invention;

FIG. 6B is a diagram showing basic area map data as an example of data stored in a storage unit of the server apparatus according to an embodiment of this invention; and FIG. 6C is a diagram showing basic process map data as an example of data stored in a storage unit of the server apparatus according to an embodiment of this invention.

FIG. 7 is a block diagram of a terminal apparatus according to Embodiment 1 of this invention.

FIG. 13 is a diagram of a system device chart stored in a storage unit of the server apparatus according to Embodiment 2 of this invention.

BEST MODE FOR CARRYING OUT THE INVENTION

A system for managing a process system and program for the same, which are embodiments of this invention, will be described with reference to the drawings. Note that the configuration of the present invention is not limited to the embodiments. Also, the order of various processes that constitute various flows described herein is arbitrary as long as there is no conflict or the like over the process content.

Embodiment 1

1. Configuration of Management System 1 for Process System (Steam Supply System)

Figure 1:
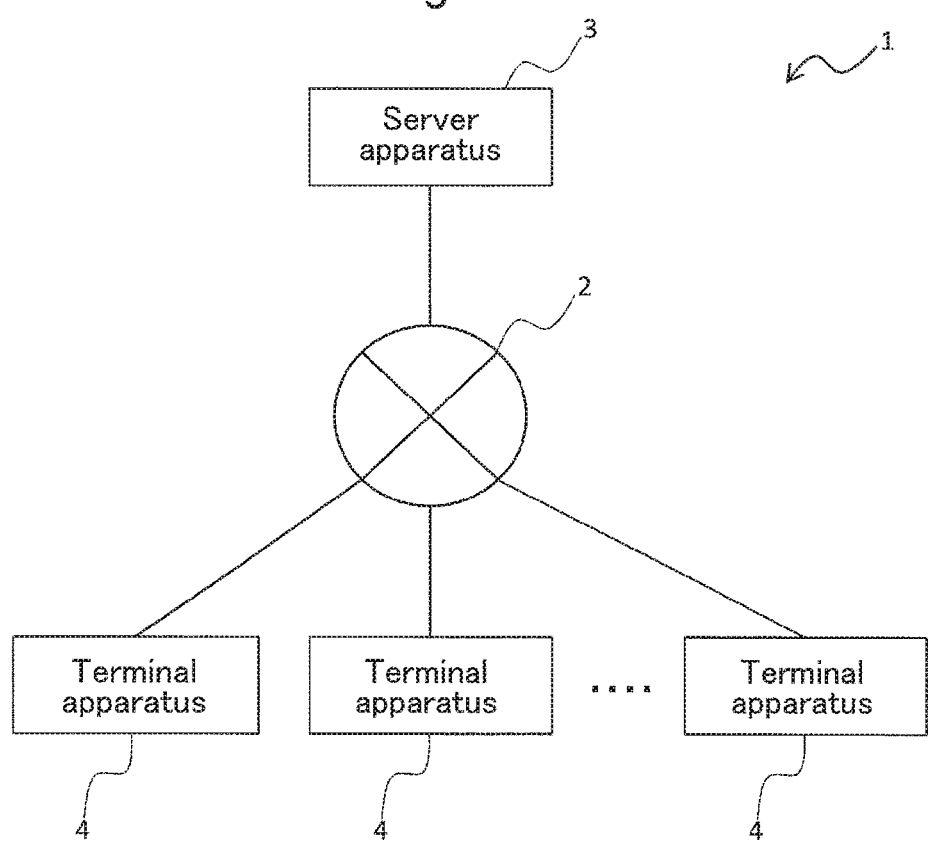
FIG. 1 is a diagram showing a configuration of a system for managing a process system according to Embodiment 1 of this invention.

FIG. 1 is a diagram showing a configuration of a management system 1 for a process system. In this embodiment, a steam supply system, which is one type of process system, will be described. The management system 1 is constituted by a server apparatus 3, a plurality of terminal apparatuses 4, and the like, and manages information on system devices that constitute the steam supply system. The steam supply system supplies steam to a steam using device in a facility such as a steam plant. A steam generation apparatus such as a boiler, a transport pipe for transporting steam, a steam trap for discharging drainage, and a steam using device that uses steam such as heat exchanger or the like correspond to the system configuration device. Information on steam traps, which are one type of system device, is managed in the management system 1 of this embodiment.

The server apparatus 3 is connected to a plurality of terminal apparatuses 4 via a network line 2, and stores and manages various types of information on a plurality of steam traps provided in the steam supply system. The various types of information on the steam traps include the results of examining the steam leakage amount, and maintenance history about repair, replacement, and the like. Also, the various types of information on the steam traps include information on an area map (arrangement map) that indicates the arrangement positions of steam traps in a plant or the like in which the steam supply system is installed, and a process map that indicates processes of the steam supply system.

The area map refers to a map that indicates a relationship of the physical positions of system devices such as steam traps. Also, the process map refers to a map in which system devices that belong to the same process are associated with each other. Note that it is not necessarily the case that system devices that belong to the same process are located close to each other physically. That is, system devices that belong to the same process may be located at positions that are physically distant from each other.

The terminal apparatus 4 is a portable personal computer, a tablet terminal having a touch panel, or the like, receives various types of information on steam traps from the server apparatus 3, and displays the received information on a monitor or the like. Also, if predetermined information on the result of examining the steam traps, maintenance history, and the like is updated, the terminal apparatus 4 transmits the used information to the server apparatus 3. The server apparatus 3 receives this update information and updates various types of information on the corresponding steam traps.

2. Outline of Management System 1 for Steam Supply System

Figure 2:
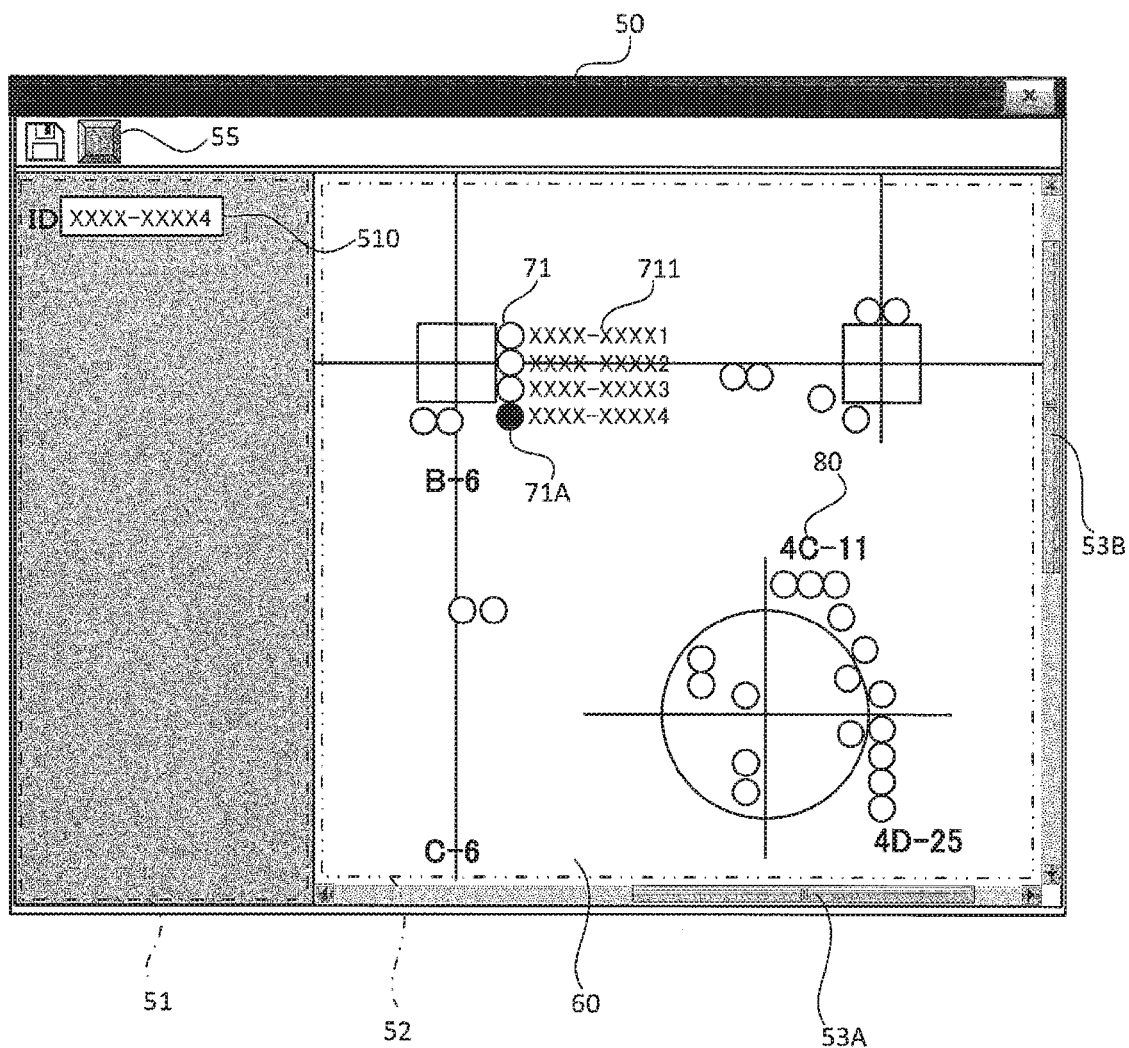
FIG. 2 is a diagram showing an example of a window image that displays various type of information on a steam trap according to Embodiment 1 of this invention.

FIG. 2 is a diagram showing an example of a window 50 that displays various types of information of steam traps 71. The window 50 is a web browser, for example, and is displayed on a monitor of the terminal apparatus 4. The window 50 is constituted by an information display area 51, a map information display area 52, and the like. An input field 510 for designating the steam traps 71 that constitute the steam supply system are displayed on the information display area 51. Various types of information (not shown) relating to the steam traps 71 are displayed on the information display area 51 by a user inputting an identification ID of the steam trap 71 that is to be designated in the input field 510. Also, a window (not shown) for inputting update information when a replacement was implemented and the like is provided in the information display area 51.

An area map or a process map is selectively displayed on the map information display area 52. FIG. 2 shows a state in which an area map 60 is displayed on the map information display area 52. The steam traps 71 are displayed on the area map 60 as icon images "○" having a black outline, for example. Note that a specific steam trap 71 is designated by adding a specific identifier, such as a letter like "A" or "B", for example, to the end of the reference sign "71" that indicates the steam trap. The steam traps 71 are displayed along with identification IDs 711 of the steam traps 71, such as "XXXX-XXXX1". Also, area information 80 such as "4C-11" is displayed on the area map 60. The area information 80 is information that specifies a plurality of areas that are set by sectioning a site such as a plant where the steam supply system is installed. Note that in FIG. 2, the identification ID 711 is displayed for only some steam traps 71.

Also, a steam trap having the identification ID designated in the input field 510 is displayed on the area map 60 in a mode with which it is distinguished from the other steam traps. For example, in FIG. 2, the icon image of the steam trap 71A having the designated identification ID "XXXX-XXXX4" is displayed in a color (red, for example) that is different from the color of the other steam traps 71. Therefore, the user can easily specify the position of the designated steam trap 71 in the area map 60.

Note that the area map 60 shown in FIG. 2 indicates the state in which only a portion of the area map 60 is displayed. The portion that is not displayed can be displayed by moving scroll bars 53A and 53B with touch operations and cursor operations so as to scroll the area map 60. Also, the area map 60 and the process map 65 (see FIG. 3) can be switched alternately in the map information display area 52, by touch operations or the like on a button icon (a switching button 55) that is displayed on the window 50. Note that although only the steam traps 71 are displayed on the area map 60 of this embodiment, another system device may be displayed.

Figure 3:
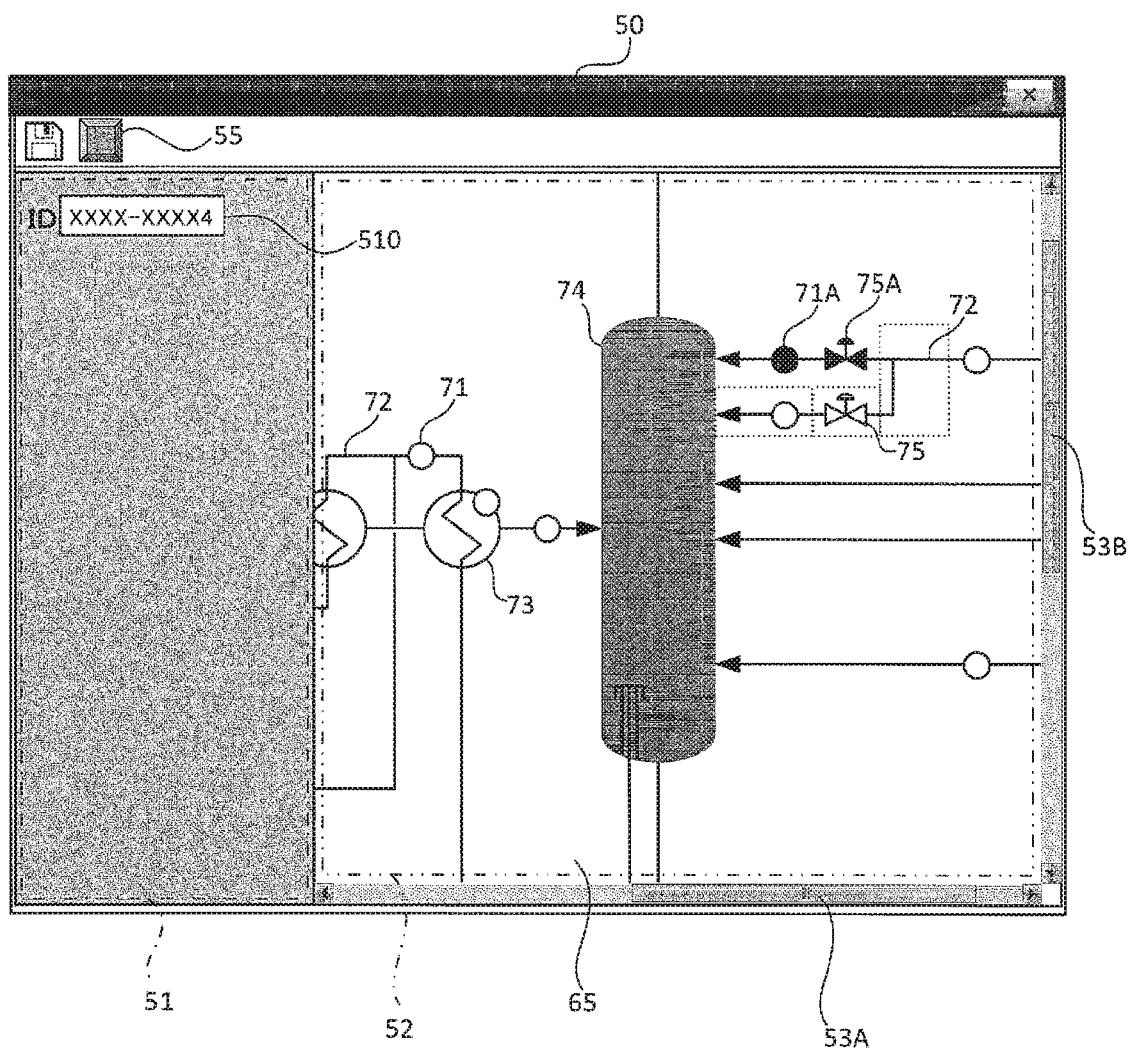
FIG. 3 is a diagram showing an example of a window image that displays various type of information on a steam trap according to Embodiment 1 of this invention.

FIG. 3 shows an example of the window 50 in which the process map 65 is displayed on the map information display area 52. The process map 65 is a diagram showing the processes of the steam supply system. In the process map 65, in addition to the icon images of the steam traps 71, icon images of a transport pipe 72, a heat exchanger 73, a chamber 74, a pressure regulating valve 75, and the like are displayed such that their connection relationship is understandable by the system devices being associated with each other, or specifically, linked by the transport pipe 72, so as to indicate that the system devices belong to the same process. Note that as shown by dotted lines in the process map 65 of FIG. 3, the icon images of the steam traps 71 and the like are icon images that also include connection portions. Accordingly, simply arranging the icon images at positions determined in advance makes it possible to express the state in which each system device is connected to an adjacent system configuration device.

Also, in the steam supply system, the order of processes matches a relationship in which system devices of the steam supply system are connected to each other. That is, the user can grasp the connection relationship of the system devices, that is, the processes, by viewing the process map 65. Note that because this steam supply system is a known system, detailed description of the configuration thereof is omitted. Similarly to the area map 60, the process map 65 can also be scrolled by moving the scroll bars 53A and 53B.

In the process map 65, in addition to the steam trap 71 having the identification ID designated in the input field 510 of the information display area 51, system devices associated with the designated steam trap 71 in a process are also displayed in a mode that distinguishes them from other system devices. For example, in FIG. 3, the steam trap 71A having the identification ID "XXXX-XXXX4" designated in the input field 510 is displayed in a color (red, for example) different from the color of the other system devices (the heat exchanger 73 and the like). Moreover, the chamber 74 and the pressure regulating valve 75A, which are system devices associated with the steam trap 71A in the process, are also displayed in a color (red, for example) different from the color of the other system devices. The system devices associated with the steam trap in the process are the system devices that are affected by the malfunction of a steam trap 71, for example; specifically, the system devices or the like whose operation efficiency decreases. Accordingly, even if the user does not have advanced knowledge, he or she can easily grasp which type of system devices will be affected if a given steam trap 71 malfunctions.

Therefore, if there are a plurality of steam traps 71 that are due to be replaced, for example, the user can easily judge, based on the process map 65 shown in FIG. 3, which steam trap 71 is to be replaced preferentially from the viewpoint of the system devices associated with the steam trap 71. The user can then easily specify the arrangement position of the steam trap 71 that is to be replaced preferentially, based on the area map 60 shown in FIG. 2. The user need only go to the location of the steam trap that is to be replaced and perform replacement work. The steam traps 71 can be efficiently managed in this manner. Note that the user can perform switching from the area map 60 to the process map 65, or from the process map 65 to the area map 60 by selecting the switching button 55 shown in FIGS. 2 and 3.

Figure 4:
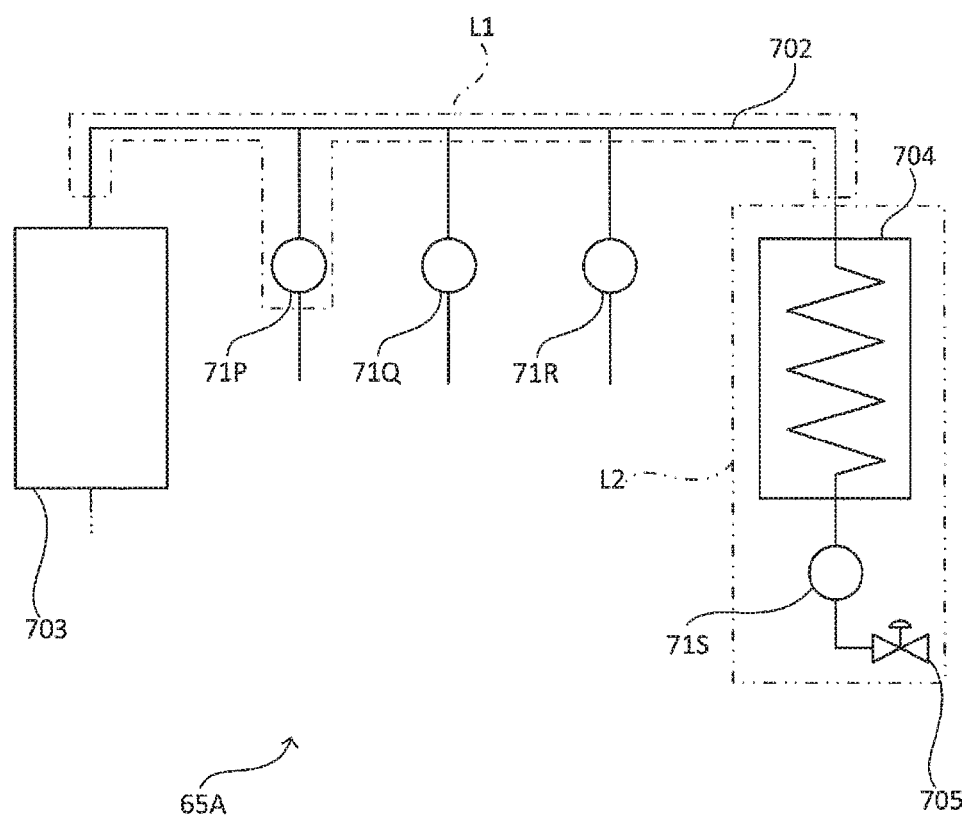
FIG. 4 is a diagram showing a portion of a process map of a steam supply system according to Embodiment 1 of this invention.

For example, description will be given using a steam supply system such as shown in FIG. 4. FIG. 4 is a diagram showing a portion of the process map (referred to as "process map 65A" hereinafter) of a given steam supply system. Note that the steam supply system shown in FIG. 4 has a configuration different from that of the steam supply system shown in FIG. 3. The steam supply system shown in FIG. 4 is constituted by steam traps 71P to 71S, a transport pipe 702, a boiler 703, a steam using device 704, a pressure regulating valve 705, and the like.

In the steam supply system shown in the process map 65A shown in FIG. 4, steam generated in the boiler 703 is supplied to the steam using device 704 via the transport pipe 702. The steam traps 71P to 71R are respectively arranged in a down pipe partway along the transport pipe 702, and discharge drainage so that the drainage does not remain in the transport pipe 702. Also, the steam trap 71S, the pressure regulating valve 705, and a water recovery pump (not shown) are connected in the stated order to the outlet side of the steam using device 704. The steam trap 701S discharges drainage generated in the steam using device 704.

If the steam traps 71P and 71S are due to be replaced, the user inputs the identification ID of each steam trap in the input field 510 of the window 50 shown in FIG. 3, and causes the process map 65A that displays another system device associated with the steam traps 71P and 71S and is shown in FIG. 4 to be displayed on the map information display area 52 of the window 50 shown in FIG. 3. At this time, if the user has input the identification ID of the steam trap 71P, the process map 65A in which the steam trap 71P and the transport pipe 702 that are included in a region L1 are indicated in red is displayed on the map information display area 52 as the system device associated with the steam trap 71P in the process. Similarly, if the user has input the identification ID of the steam trap 71S, the process map 65A in which the steam trap 71S, the steam using device 704, and the pressure regulating valve 705 that are included in a region L2 are indicated in red is displayed on the map information display area 52. Therefore, the user can judge, from the viewpoint of system device associated with the steam traps, or from the viewpoint of system devices that are affected by the malfunction of the steam traps, that the steam trap 71S whose malfunction affects a large number of system devices should be replaced preferentially.

Note that regarding the system devices associated with each steam trap in a process, this is set in advance for each system device such as the steam traps, from the past experience with management of steam supply systems, the characteristics of steam supply systems, and the like.

In this embodiment, one steam trap 71 can be designated, but a configuration is possible in which a plurality of steam traps 71 can be designated simultaneously. For example, it is sufficient that two input fields are provided in the information display area 51. If the two steam traps 71P and 71S shown in FIG. 4 are designated, it is sufficient that the system devices are displayed in different colors, that is, the system devices in the region L1 are displayed in red, and the system devices in the region L2 are displayed in blue, for example. Note that it is sufficient that the same is applied to the area map 60.

Also, in this embodiment, even if display of the area map 60 and the process map 65 is switched, the designation of the steam trap 71 (the identification ID) in the input field 510 of the information display area 51 is maintained. Therefore, for example, even if the display is switched from the area map 60 that is shown in FIG. 2 and in which the steam trap 71A is displayed in red to the corresponding process map 65, the red display of the steam trap 71A is maintained in the process map 65 shown in FIG. 3 and other system devices associated with the steam trap 71A are displayed in red. The case where display is switched from the process map 65 shown in FIG. 3 to the corresponding area map 60 is opposite to the above-described case. Therefore, in the system 1 for managing a steam supply system, it is not necessary to designate a steam trap 71 every time display of the area map 60 and the process map 65 is switched, and thus convenience to the user is high.

The above-described information on the system devices associated with the steam traps 71 is stored in the server apparatus 3 for each steam trap 71. Note that the display of the information on the steam traps 71 is not limited to the display mode of the window 50 shown in FIGS. 2, 3, and the like, and may be any display mode. Also, although in the process map 65, the designated steam trap 71 is also displayed in a mode with which it is distinguished from the other system devices, they may not be displayed in a distinguishable mode.

3. Configuration of Server Apparatus 3

Figure 5:
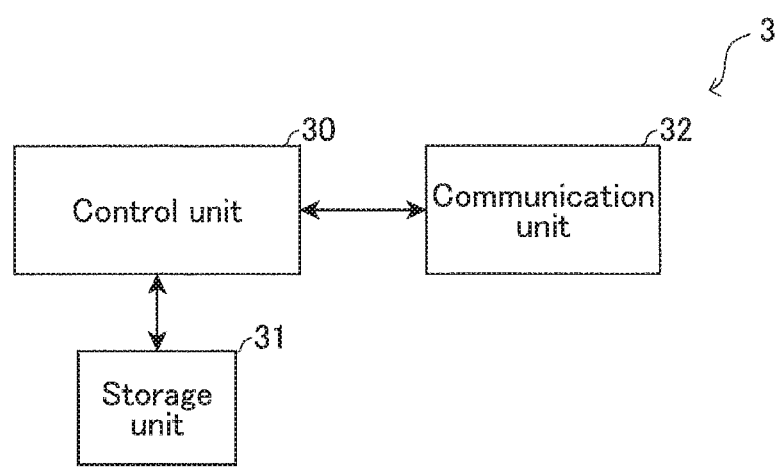
FIG. 5 is a block diagram of a server apparatus according to Embodiment 1 of this invention.

FIG. 5 is a block diagram of the server apparatus 3. In order to perform the above-described processes, the server apparatus 3 includes a control unit 30, a storage unit 31, a communication unit 32, and the like. The storage unit 31 is constituted by a hard disk, a RAM, or the like, for example. Also, the storage unit 31 stores a system device chart indicating various types of information relating to the steam traps 71, basic area map data for displaying the area map 60, basic process map data for displaying the process map 65, a program for a server apparatus of the management system 1, and the like. The control unit 30 is constituted by a CPU and the like, and executes the program for a server apparatus stored in the storage unit 31 and performs control to store and manage various types of information on the steam traps 71. The communication unit 32 controls communication with the network line 2.

A system device chart 90 is shown in FIG. 6(A), the basic area map data is shown in FIG. 6(B), and basic process map data is shown in FIG. 6(C).

As shown in FIG. 6(A), the system device chart 90 includes various types of information relating to one steam trap 71 and is associated with the identification ID of the corresponding steam trap 71. The system device chart 90 also includes associated identification IDs. The associated identification ID includes the identification IDs of one or more system devices associated with the steam trap 71. As described above, the system devices associated with the steam traps 71 are displayed on the process map 65 based on this associated identification ID. Note that the associated identification ID does not only include the identification IDs of the system devices adjacent to the steam trap 71, but also the identification IDs of system devices associated with the steam trap that although not adjacent to the steam trap 71, are affected by a malfunction of the steam trap 71 or the like. Note that the system device chart 90 relating to all of the steam traps 71 that constitute the steam supply system is stored in the storage unit 31.

As shown in FIG. 6(B), the basic area map data 91 includes position coordinate information that indicates the position coordinates of system devices such as the steam traps 71 on the area map 60. Also, the basic area map data 91 includes area information that specifies an area in which the system devices are arranged. As shown in FIG. 6(C), the basic process map data 92 includes position coordinate information that indicates the position coordinates of the system devices such as the steam traps 71 on the process map 65. Since only the steam traps 71 are displayed on the area map 60 in this embodiment, the basic area map data 91 includes the identification IDs of the steam traps 71 and the position coordinate information stored in association with each other. On the other hand, the basic process map data 92 includes the identification IDs of not only the steam traps 71 but also all the system devices that constitute the steam supply system and position coordinate information stored in association with each other.

Also, image data of icons for the maps 60 and 65 and the like, and a table in which the identification IDs of the system devices and addresses where icon images are stored are associated with each other are stored in the storage unit 31 as the information associated with the area map 60 and the process map 65. Therefore, the icon images of the system devices can be acquired using storage addresses that are specified from the identification IDs of the system devices.

The server apparatus 3, based on the identification ID or the like of a system device received from the terminal apparatus 4, reads out the system device chart 90, the basic area map data 91, the basic process map data 92, image information such as icons, and the like of the corresponding system device, generates the area map 60 and the process map 65, and transmits data of the various types of information including the generated area map 60 and process map 65 to the terminal apparatus 4.

4. Configuration of Terminal Apparatus 4

FIG. 7 is a block diagram of the terminal apparatus 4. As described above, the terminal apparatus 4 receives various types of information on the steam traps 71 from the server apparatus 3 and displays it on a monitor or the like. The terminal apparatus 4 includes a control unit 40, a storage unit 41, an operation unit 42, a display unit 43, a communication unit 44, and the like. The storage unit 41 stores programs for a terminal apparatus of the management system 1, and the like.

The control unit 40 is constituted by a CPU and the like, and executes the program for a terminal apparatus stored in the storage unit 41 and performs control to display various types on information on the steam traps 71. The operation unit 42 is a keyboard, a touch panel, or the like, for example, and accepts an input operation for the identification ID and the like on the window 50. The display unit 43 is a monitor such as a liquid crystal display, and displays an image of the window 50 and the like. The communication unit 44 controls communication with the network line 2.

5. Flowchart

Figure 8:
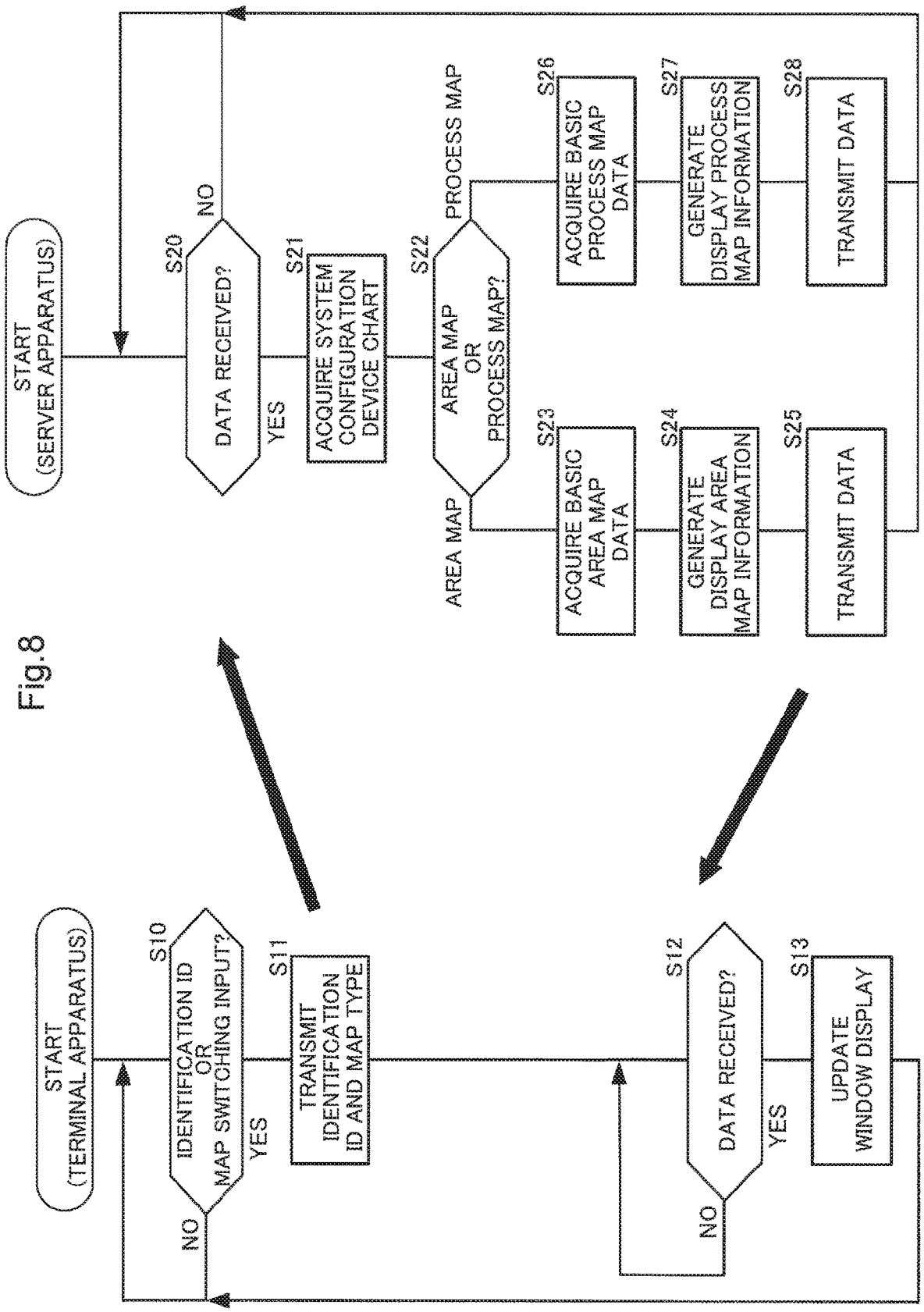
FIG. 8 is a flowchart showing transmission request processing for requesting steam trap map generation and switching processing according to Embodiment 1 of this invention.

FIG. 8 is a flowchart showing steam trap map generation and switching processing that is executed by the system 1 for managing the steam supply system. The map generation and switching processing is processing for displaying the above-described various types of information of the designated steam trap 71 on the window 50. Processing from step S10 to step S13 is executed by the control unit 40 (see FIG. 7) of the terminal apparatus 4. Also, processing from step S20 to step S28 is executed by the control unit 30 (see FIG. 5) of the server apparatus 3.

When the user operates the operation unit 42 (see FIG. 7) of the terminal apparatus 4 to activate the window 50, the window 50 in which the information on the steam traps 71 is not displayed is displayed on the display unit 43 (see FIG. 7). Then, the window 50 being displayed triggers the control unit 40 of the terminal apparatus 4 to start this transmission request processing.

First, the control unit 40 waits until the identification ID of a system device is input or map display setting switching is input (step S10: YES). The control unit 40 judges whether an identification ID has been input, depending on whether or not an identification ID has been input to the input field 510. Also, the control unit 40 judges whether map display setting switching has been input, depending on whether or not the switching button 55 displayed on the window 50 has been selected. If it is judged that the identification ID or map display setting switching has been input (step S10: YES), the control unit 40 transmits the identification ID that is input to the input field 510 and the type of map displayed on the map information display area 52 to the server apparatus 3, and makes a request for transmission of various types of information (step S11). The control unit 40 then waits until information from the server apparatus 3 is received (step S12: YES).

Note that in the processing of step S11, even if either the identification ID or the map display setting switching has been input, the control unit 40 transmits the identification ID that has been input to the input field 510 and the type of map displayed on the map information display area 52. Note that if the identification ID has been input to the input field 510, the control unit 40 transmits the type of map that is currently being displayed on the map information display area 52 to the server apparatus 3 together with the identification ID. On the other hand, if map display setting switching has been input, the control unit 40 transmits the identification ID that is currently designated and information on the designated map type that is not the currently set map type to the server apparatus 3. Accordingly, even if display of the map 60 and 65 is switched, the designation of the steam trap 71 can be maintained.

The activation of the apparatus triggers the control unit 30 of the server apparatus 3 to start the map generation and switching processing. First, the control unit 30 waits until receiving the identification ID and the type of map (step S20: YES). If it is judged that the identification ID and the map type have been received (step S20: YES), the control unit 30 reads out the system device chart 90 that corresponds to the received identification ID from the storage unit 31 (step S21). Next, the control unit 30 judges whether or not the received map type is an area map or a process map (step S22). When it is judged in step S22 that the received map type is the area map, the control unit 30 reads out the basic area map data 91 from the storage unit 31 (step S23). The control unit 30 generates display area map information for displaying the area map 60 in which the system device that corresponds to the received identification ID is distinguished from the other system devices, using the acquired basic area map data 91 (step S24). The control unit 30 transmits the readout system device chart 90 and the generated display area map data to the terminal apparatus 4 that made the request (step S25).

On the other hand, if it is judged that the map type received in the processing of step S22 is the process map, the control unit 30 reads out the basic process map data 92 from the storage unit 31 (step S26). The control unit 30 generates display process map information for displaying the process map 65 in which the system device that corresponds to the associated system device information of the system device that corresponds to the received identification ID is distinguished from the other system devices, using the acquired basic process map data 92 (step S27). The control unit 30 transmits the readout system device chart 90 and the generated display process map data to the terminal apparatus 4 that made the request (step S28). The control unit 30 then returns to the processing of step S20, and continues the above-described processing until activation of the server apparatus 3 ends. Note that the basic area map data 91, the basic process map data 92, and the like that are required to generate the area map 60 in which the system device that corresponds to the designated identification ID is distinguished from the other system devices and the process map 65 in which the system device that corresponds to the associated system device information of the system device that corresponds to the designated identification ID is distinguished from the other system devices may be transmitted from the server apparatus 3 to the terminal apparatus 4, and the terminal apparatus 4 may generate predetermined display area map information and display process map information.

If it is judged that the information has been received from the server apparatus 3 (step S12: YES), the control unit 40 of the terminal apparatus 4 updates display of the window 50 based on this information (step S13). The control unit 40 then returns to the processing of step S10, and continues the above-described processing until the window 50 is closed.

As described above, the system 1 for managing the steam supply system displays the area map 60 that indicates the arrangement positions of system devices of the steam supply system and the process map 65 that indicates other system devices associated with the system devices (the steam traps 71). Therefore, the user who uses the system devices can easily grasp the association between target system devices (the steam traps 71) and the other system devices. Accordingly, the user can easily judges work priority or the like based on this association, and can efficiently maintain and manage the functions of the process system (the steam supply system).

Embodiment 2

Similarly to the management system 1 of Embodiment 1, a management system 100 of this embodiment manages information regarding the steam traps 71, which is one type of system device, and displays various types of information on the steam traps 71 on the window 50. Unlike the first embodiment, the management system 100 also displays the operation state of the steam traps 71 in the area map 60 and the process map 65. Hereinafter, the configuration that is different from the first embodiment will be mainly described.

1. Configuration of Management System 100 for Process System (Steam Supply System)

Figure 9:
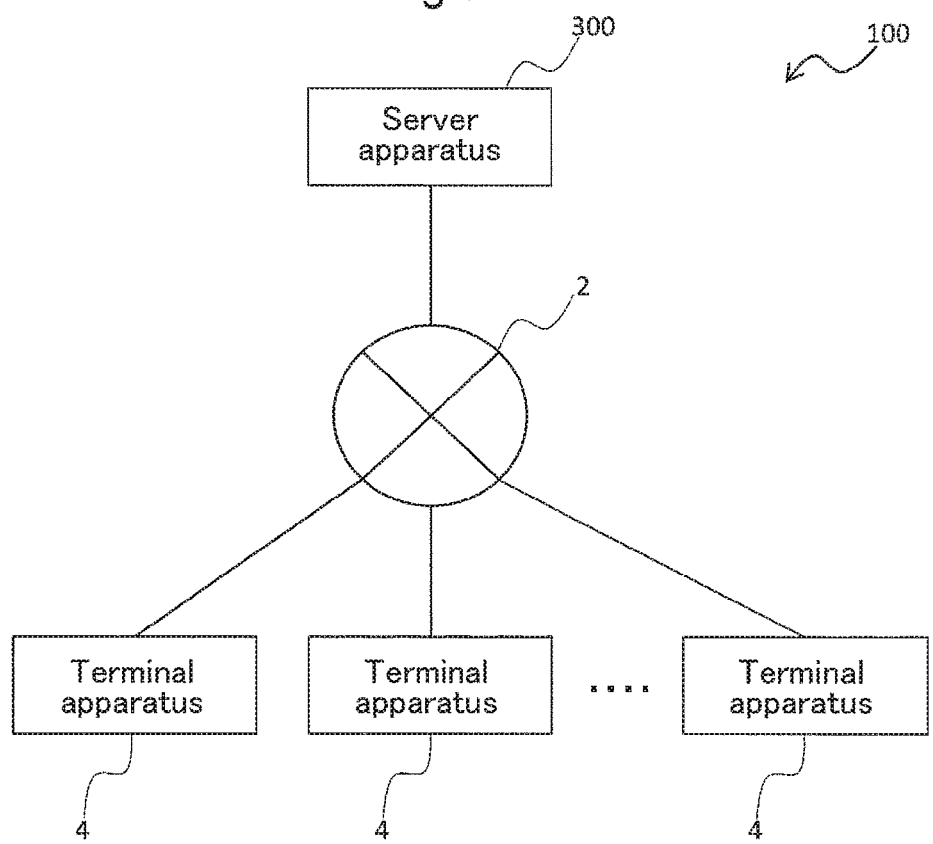
FIG. 9 is a diagram showing a configuration of a system for managing a process system according to Embodiment 2 of this invention.

FIG. 9 is a diagram showing a configuration of a system 100 for managing a process system. The management system 100 is constituted by a server apparatus 300, a plurality of terminal apparatuses 4, and the like. Similarly to Embodiment 1, the server apparatus 300 is connected to the plurality of terminal apparatuses 4 via network lines 2, and stores and manages various types of information of a plurality of steam traps 71 provided in a steam supply system.

2. Outline of Management System 100 for Steam Supply System

Figure 10:
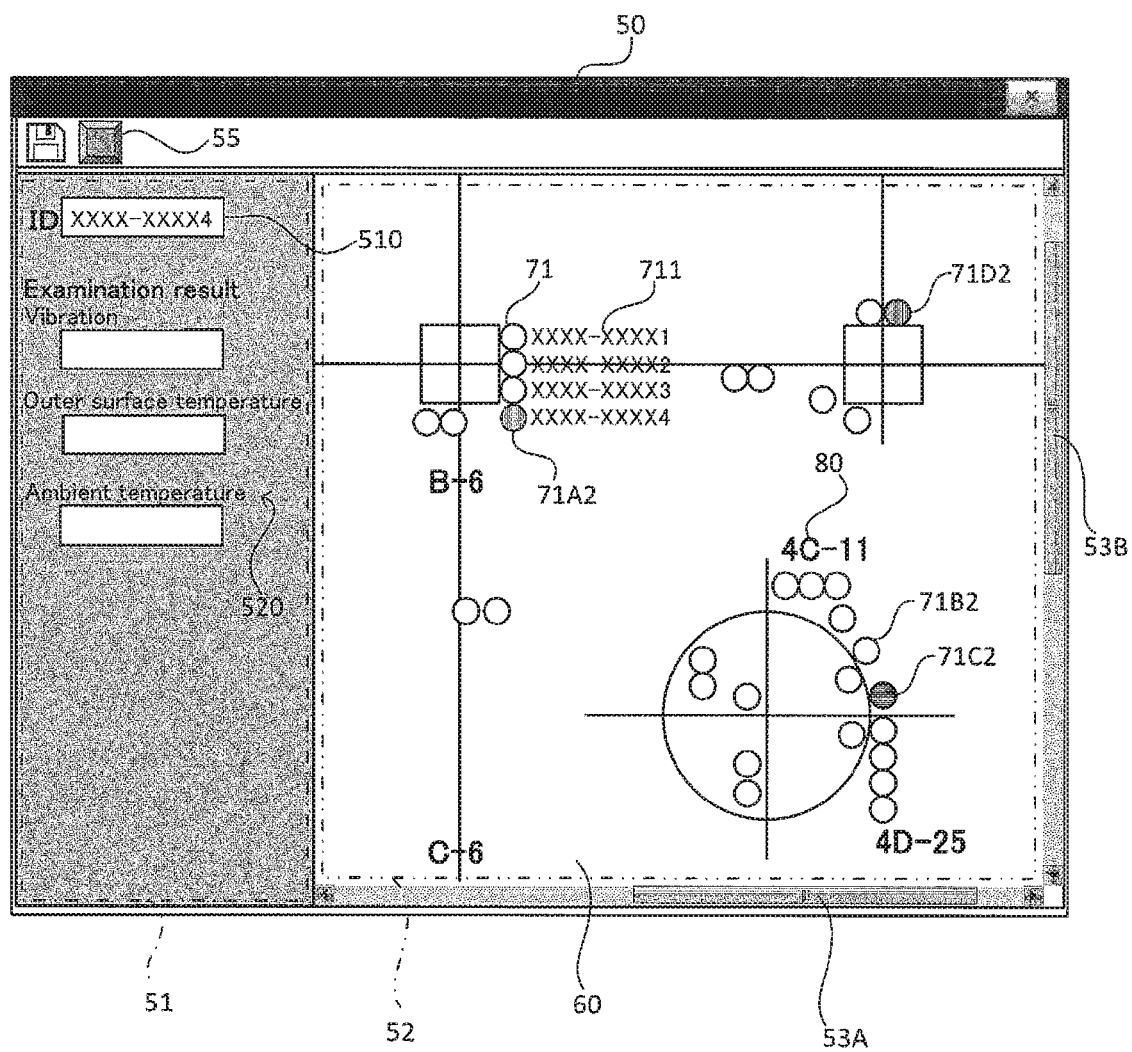
FIG. 10 is a diagram showing an example of a window image that displays various types of information on steam traps according to Embodiment 2 of this invention.
Figure 11:
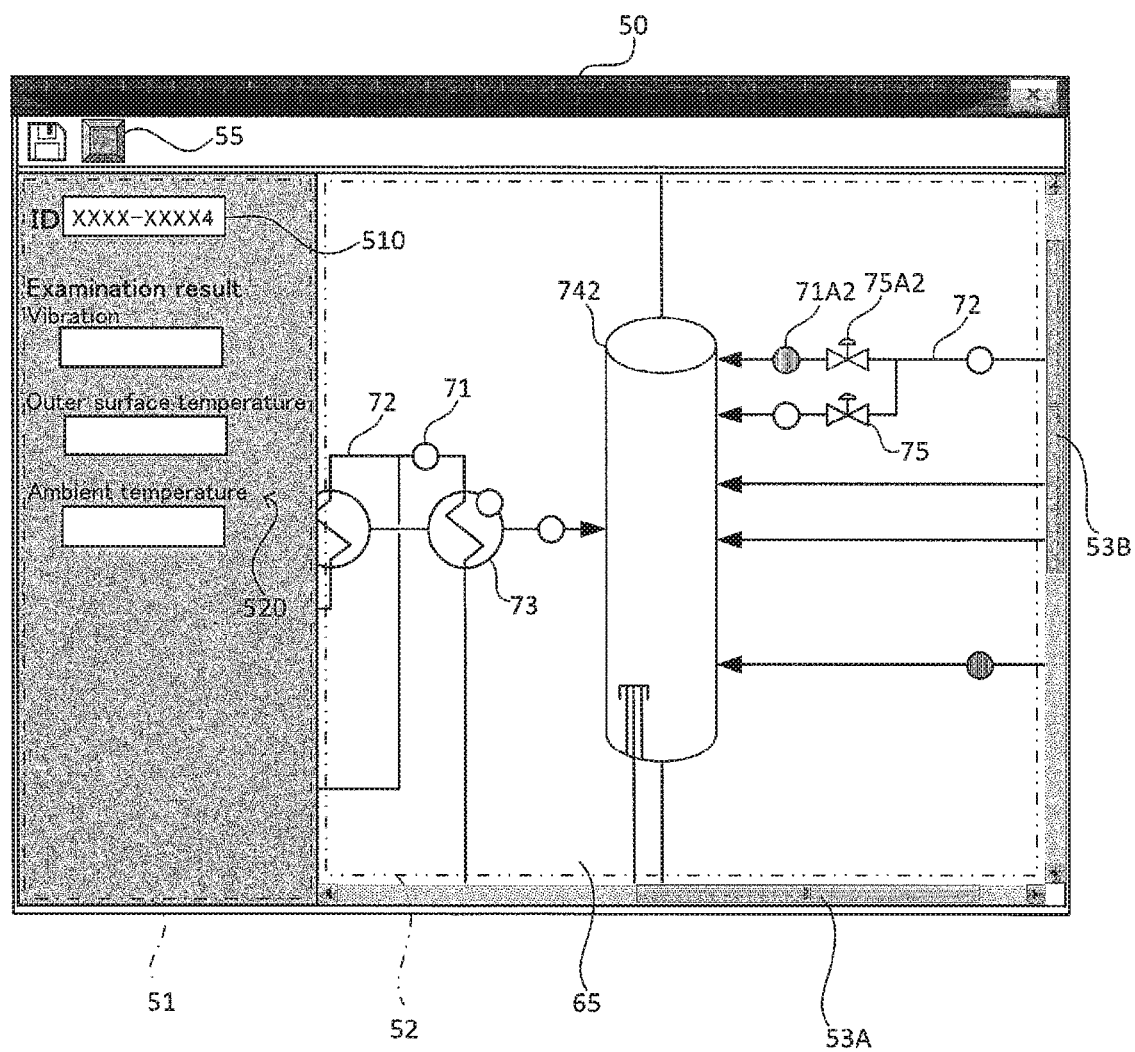
FIG. 11 is a diagram showing an example of a window image that displays various types of information on steam traps according to Embodiment 2 of this invention.

FIGS. 10 and 11 are diagrams showing an example of the window 50 that displays various types of information on the steam traps 71. FIG. 10 shows the state in which the area map 60 is displayed, and FIG. 11 shows the state in which the process map 65 is displayed. Note that FIGS. 10 and 11 show the area map 60 and the process map 65 of the steam supply system, which are similar to those of FIGS. 2 and 3 of Embodiment 1.

Similarly to Embodiment 1, the window 50 is constituted by the information display area 51, the map information display area 52, and the like. Similarly to Embodiment 1, an input field 510 for designating the steam traps 71 and the like are displayed on the information display area 51. Also, a portion (an examination result input field 520) of the window for inputting update information that is not shown in Embodiment 1 is shown in FIGS. 10 and 11. By the user inputting the result of examining the steam trap 71 to the examination result input field 520, the result of examining the steam traps 71 (update information) is transmitted from the terminal apparatus 4 to the server apparatus 300. Details will be described later.

Similarly to Embodiment 1, the area map 60 and the process map 65 are selectively displayed on the map information display area 52. Similarly to Embodiment 1, in the process map 65, the steam trap 71 (the icon image) having the identification ID designated in the input field 510 is displayed in a mode with which it is distinguished from the other steam traps 71 (the other system devices). Specifically, an outline portion of the icon image of the designated steam trap 71 is displayed in a color (red, for example) different from the display color of the icon images of the other steam traps 71. Also, similarly to Embodiment 1, in the process map 65 as well, in addition to the steam trap 71 having the identification ID designated in the input field 510 of the information display area 51, system devices associated with the designated steam trap 71 in the process are displayed in a mode with which they are distinguished from the other system devices. Specifically, similarly to the display mode for the area map 60, outline portions of the icon images of the designated steam trap 71 and the associated system devices are displayed in a color (red, for example) different from the display color of the icon images of the other system devices.

Also, unlike Embodiment 1, in this embodiment, regardless of the designation in the input field 510, the icon images are displayed in different modes in accordance with the operation state of the corresponding steam trap 71. Specifically, an icon image that is not hatched (a steam trap 71B2, for example) indicates a normal state, which is a state in which the corresponding steam trap 71 operates normally. Icon images (steam traps 71A2 and 71D2, for example) that are hatched with vertical parallel lines indicate an abnormal state in which the corresponding steam trap 71 does not operate normally due to a malfunction or the like. Also, an icon image (a steam trap 71C2, for example) that is hatched with horizontal parallel lines indicates an inactive state in which the operation of the corresponding steam trap 71 has stopped. The processing for determining the operation state of a steam trap will be described later.

Therefore, if the steam trap 71A2 that is in an abnormal state is designated, for example, the icon image of the steam trap 71A2 is displayed in a mode with which the icon image has a red outline and is hatched with vertical parallel lines (red, for example) in the area map 60. Also, in the process map 65 as well, the icon image of the steam trap 71A2 is displayed in a mode with which the icon image has a red outline and is hatched with vertical parallel lines (red, for example). Moreover, the icon images of a chamber 742 and a pressure regulating valve 75A2, which are system devices associated with the steam trap 71A2, are also displayed in a mode with which the icon images have red outlines.

Note that the display modes for the operation state are not limited to the above-described modes (shape, color, and pattern). It is sufficient that the user can specify the operation states, and a configuration is possible in which the display modes are the same in shape but have different flashing intervals in accordance with the various operation states, for example.

3. Configuration of Server Apparatus 300

Figure 12:
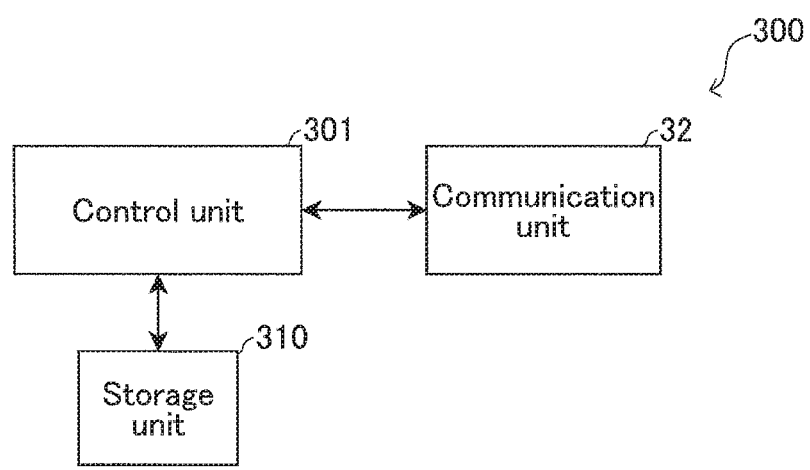
FIG. 12 is a block diagram of a server apparatus according to Embodiment 2 of this invention.

FIG. 12 is a block diagram of the server apparatus 300. In order to perform the above-described processes, the server apparatus 300 includes a control unit 301, a storage unit 310, the communication unit 32, and the like. Similar to Embodiment 1, the control unit 301 performs control to store and manage various types of information on the steam traps 71. Similarly to Embodiment 1, the storage unit 310 stores a system device chart 900, basic area map data 91 (not shown), basic process map data 92 (not shown), and the like.

Also, the image data of icon images for maps is stored in the storage unit 310 as information associated with the area map 60 and the process map 65. Here, the image data of icon images is stored for each display mode (no hatching, hatching with horizontal or vertical parallel lines). That is, even in the case of the icon images of the same steam traps 71, three types of icon images corresponding to the operation state are respectively stored for the maps. Also, a table in which the identification IDs of the system devices and the storage addresses of the icon images are stored in association with each other is also stored in the storage unit 310. Therefore, the server apparatus 300 can acquire the icon images of the system devices using storage addresses specified from the identification IDs of the system devices. Note that the icon images of the steam traps 71 need only be acquired using the identification IDs of the system devices and storage addresses specified from the operation state. For example, the icon image can be acquired using an address obtained by adding a value corresponding to the operation state to the storage address specified from the identification ID of the steam trap 71. Also, in the case of the designated steam trap 71, it is sufficient that processing for setting the outline of the acquired icon image and the display color of hatching to red is performed.

FIG. 13 is a diagram showing the system device chart 900 stored in the storage unit 310. Although the system device chart 900 have a configuration that is substantially similar to the system device chart 90 of Embodiment 1, the system device chart 900 is different in that information on the operation states of the steam trap 71 is registered. Any one of the above-described three operation states is set in the operation state. The server apparatus 300 (the control unit 301) determines the operation state based on the examination result.

4. Determination of Operation State of Steam Trap 71

The operation state of the steam trap 71 is determined based on the temperature and vibration at an ultrasonic level of the outer surface of the steam trap 71, and the ambient temperature of the steam trap. The above-described vibration and two temperatures are detected using a sensor for vibration and temperature. The above-described three operation states are determined by estimating the steam leakage amount through collating the detected vibration and the like with determination reference information (correlation data on trap type, temperature, vibration, and steam leakage amount, for example). Note that the determination reference information need only be stored in the storage unit 310.

The above-described vibration and the like of the steam trap 71 are detected by the user going to the location at which the steam trap 71 is installed and bringing a portable collector provided with the above-described sensor in contact with the steam trap. As described above, the detection (examination) result is then input in the examination result input field 520 of the terminal apparatus 4. The terminal apparatus 4 transmits the examination result to the server apparatus 300 together with the device identification ID of the corresponding steam trap 71. The server apparatus 300 determines the operation state from the examination result and registers (updates) this examination result and the determination result (the operation state) in the system device chart 900 of the corresponding steam trap 71 (the device identification ID).

Also, a configuration is possible in which a collection apparatus having the above-described sensor and communication function is installed in a state in which the sensor is in contact with the outer surface of the steam trap 71, and the collection apparatus regularly performs detection without the user, for example. In this case, the detection result is transmitted from the collection apparatus to the server apparatus 300 via wireless communication or the like. Note that because the above-described detection and operation state determination are known techniques as described in JP 2010-146186A or the like, detail description thereof is omitted.

5. Flowcharts

Figure 14:
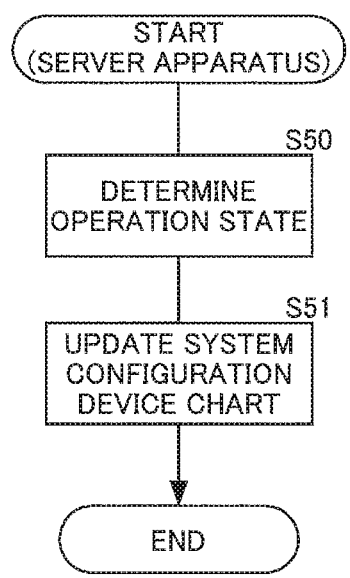
FIG. 14 is a flowchart showing processing for updating state information on the steam traps according to Embodiment 2 of this invention.

FIG. 14 is a flowchart showing processing for updating information on the state of a steam trap that is executed by the system 100 for managing the steam supply system. As described above, the update processing is processing for determining the operation state of the steam traps 71 based on the examination result as described above and updating the detection result and the operation state in the corresponding system device chart 900. The update processing is executed by the server apparatus 300 (the control unit 301). Also, the update processing is executed in the case where the update information on the examination result is received from the terminal apparatus 4, for example. After the identification ID of the steam trap 71 and the examination result are respectively input in the input field 510 and the examination result input field 520 and an examination result update button (not shown) is operated, the terminal apparatus 4 transmits the examination result to the server apparatus 300 together with the identification ID.

The control unit 301 first determines an operation state of the corresponding steam trap 71 based on the received examination result (step S50). Next, the control unit 301 modifies (updates) the examination result and the setting content of the operation state in the system device chart 900 that corresponds to the received identification ID (the steam trap 71) (step S51).

Note that although the server apparatus 300 (the control unit 301) determines the operation states of the steam traps 71 in this embodiment, the present invention is not particularly limited to this. It is sufficient that at least the operation states of the steam traps 71 are stored in the management system 100. Therefore, for example, instead of the user inputting the examination result in the terminal apparatus 4, the user may input the operation state based on the examination result and transmit the identification ID and the information on the operation state to the server apparatus 300. Alternatively, the server apparatus 300 may receive information on the operation state that is determined, based on the examination result, by another server apparatus connected communicably with the server apparatus 300.

Figure 15:
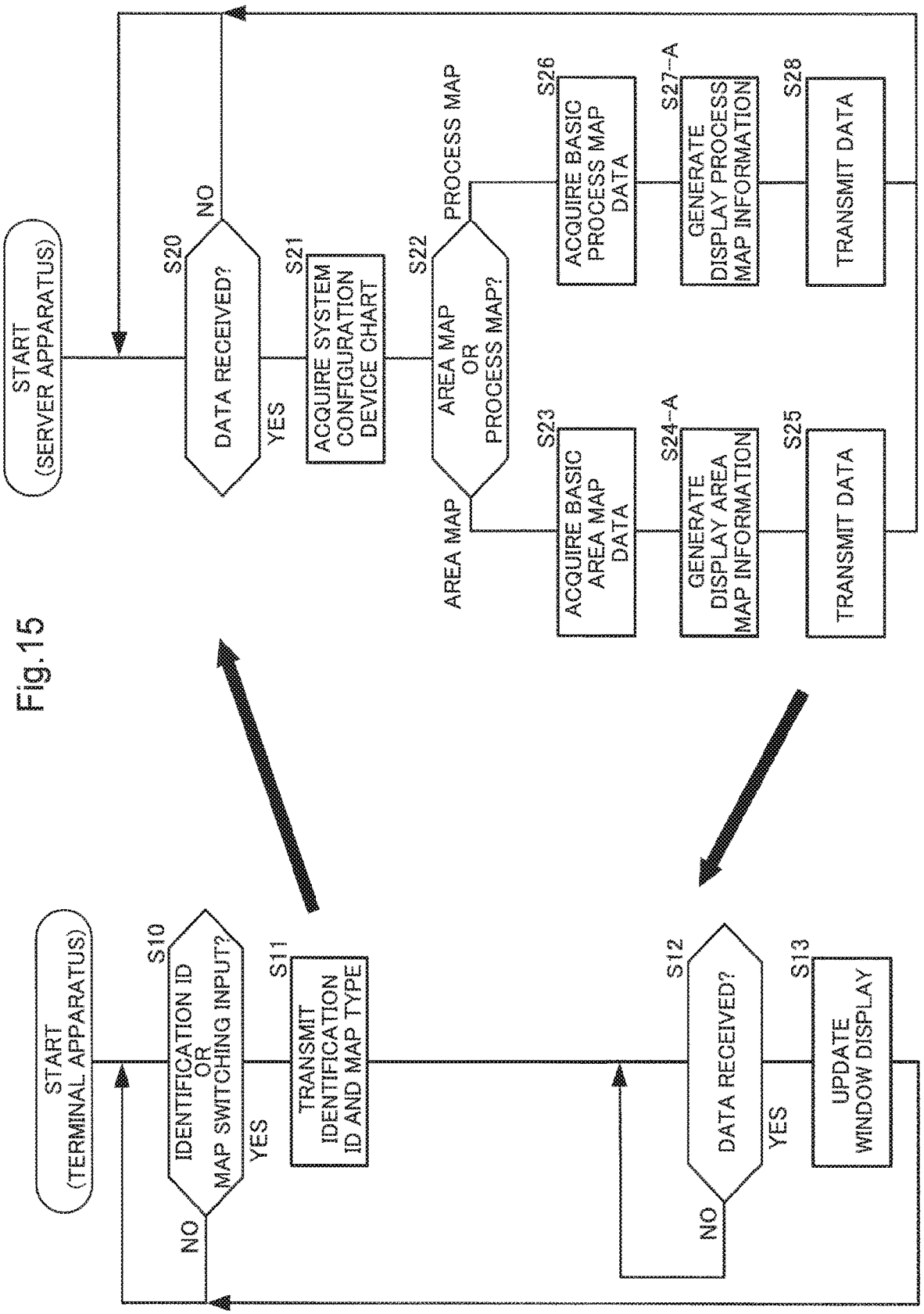
FIG. 15 is a flowchart showing steam trap map generation and switching processing according to Embodiment 2 of this invention.

FIG. 15 is a flowchart showing steam trap map generation and switching processing that is executed by the system 100 for managing the steam supply system. Similarly to Embodiment 1, the map generation and switching processing is processing for displaying various types of information of the designated steam trap 71 on the window 50. Note that description of processing similar to the map generation and switching processing of Embodiment 1 is partially omitted.

If it is judged that the identification ID or map display setting switching has been input (step S10: YES), the control unit 40 transmits the identification ID input in the input field 510 and the type of map displayed on the map information display area 52 to the server apparatus 300, and makes a request for transmission of various types of information (step S11). The control unit 40 then waits until the information from the server apparatus 300 is received (step S12: YES). Note that even if the user inputs the identification ID in the input field 510 at the time of inputting the examination result, it is sufficient that it is judged that the identification ID has been input in the processing of step S10 and that the processing is advanced.

If it is judged that the identification ID and the map type have been received (step S20: YES), the control unit 301 of the server apparatus 300 reads out the system device chart 900 corresponding to the received identification ID from the storage unit 310 (Step S21). Next, the control unit 301 judges whether the received map type is the area map 60 or the process map 65 (step S22). If it is judged in step S22 that the received map type is the area map 60, the control unit 301 reads out the basic area map data 91 from the storage unit 310 (step S23). Then, the control unit 301 generates display area map information for displaying the area, map 60 in which the system device that corresponds to the received identification ID is distinguished from the other system devices, using the basic area map data 91, the system device chart 900, and the like that are acquired (step S24-A). The control unit 301 transmits the readout system device chart 900 and the generated display area map data to the terminal apparatus 4 that made the request (step S25).

On the other hand, if it is judged that the map type received in the processing of step S22 is the process map 65, the control unit 301 reads out the basic process map data 92 from the storage unit 310 (step S26). The control unit 301 then generates display process map information for displaying the process map 65 in which the system device that corresponds to associated system device information of the system device corresponding to the received identification ID is distinguished from the other system devices, using the basic process map data 92, the system device chart 900, and the like that are acquired (step S27-A). The control unit 301 transmits the readout system device chart 900 and the generated display process map data to the terminal apparatus 4 that made the request (step S28).

If the information has been received from the server apparatus 300 (step S12: YES), the control unit 40 of the terminal apparatus 4 updates display of the window 50 based on this information (step S13).

As described above, the management system 100 of this embodiment can exhibit the effect similar to that of Embodiment 1. Furthermore, since the operation state of a specific system device (the steam trap 71) can be grasped from the area map 60 and the process map 65, the user can more efficiently maintain and manage the functions of the process system (the steam supply system).

Note that although the operation states of the steam traps 71 are displayed on the area map 60 and the process map 65 in this embodiment, the operation states of other system devices may also be displayed.

Other Embodiment

Note that although the manage systems 1 and 100 of the above-described embodiments manage only the steam traps 71, the embodiments are not particularly limited to this, and are applicable to all system devices. In this case, it is sufficient that the charts 90 and 900 of all system devices are stored.

Also, although display of the area map 60 and the process map 65 is switched in the above-described embodiments, a configuration is possible in which two map information display areas 52 are provided and displayed simultaneously. Also, as long as a steam trap 71 can be designated and the area map 60 and the process map 65 can be displayed, the information display area 51 of the window 50 need not be displayed.

Moreover, although the steam trap 71 is designated by inputting the identification ID in the input field 510 in the above-described embodiments, the present invention is not particularly limited to this. For example, a configuration is possible in which the steam trap 71 is designated by making a selection with an operation via a predetermined input unit, such as an operation of touching an icon image of the steam trap 71 displayed on the area map 60 and the process map 65. As described above, since the position coordinates of the icon images are stored in the storage units 31 and 310, the server apparatuses 3 and 300 can specify an icon image that corresponds to the position coordinates at which a touch operation or the like is performed. In this case, in the processing of step S11, instead of the identification ID, the terminal apparatus 4 need only transmit information on the position coordinates (position information) at which a touch operation or the like was performed to the servers 3 and 300. Alternatively, the terminal apparatus 4 may specify the identification ID of the steam trap 71 selected by a touch operation instead of position coordinates and transmit the specified identification ID to the server apparatuses 3 and 300. In this case, the identification ID need only be linked to an icon image in the area map and the process map in advance. In this case, the identification ID of the steam trap 71 corresponds to position information. Also, for example, a configuration is possible in which selecting an icon image of the steam trap 71 displayed on the area map 60 switches display to the process map 65, and as described above, the icon image of the selected steam trap 71 and the associated system device are displayed in a mode with which they are distinguished from other system devices.

Furthermore, although the system devices associated with the designated steam trap 71 are displayed on red on the process map 65 in the above-described embodiments, the present invention is not particularly limited to this. For example, a display mode may be changed in stages in accordance with the number of associated identification IDs of the charts 90 and 900 stored in the storage unit 31 of the server apparatus 3. Specifically, if the number of associated identification IDs is 1 or more and less than a predetermined value, the server apparatuses 3 and 300 perform control so as to display the corresponding system devices in yellow, for example. Also, if the number of associated identification IDs is the predetermined value or more, the server apparatuses 3 and 300 perform control so as to display the corresponding system device in red, for example. Accordingly, the number of the system devices associated with the steam trap 71 can be easily grasped.

Also, the display mode may be changed based on the importance of the associated system configuration device. For example, the identification ID and the importance (numerical value information) of each system device are stored in the storage units 31 and 310 in association with each other. Then, the display mode is changed based on the total value of the importance of the associated identification IDs associated with the designated steam trap. Specifically, as described above, if the total value is 1 or more and less than a predetermined value, the display mode is yellow display, for example, whereas if the total value is the predetermined value or more, the display mode is red display, for example. Accordingly, the priority of steam trap replacement or the like can be judged more specifically.

Furthermore, although the management systems 1 and 100 of the above-described embodiments are constituted by the server apparatuses 3 and 300, the terminal apparatus 4, and the like, the overall management system may be constituted by a single terminal apparatus provided with the functions of the server apparatuses 3 and 300. In this case, the network line 2 and the server apparatuses 3 and 300 are not required.

INDUSTRIAL APPLICABILITY

This invention can be utilized in industrial fields that involve the manufacture, sale, operation, and the like of steam plants and the like for power facilities to which a steam supply system that supplies steam to a steam using device is applied.

DESCRIPTION OF REFERENCE SIGNS 1, 100 Management system
2 Network line
3, 300 Server apparatus
4 Terminal apparatus
30, 301 Control unit (server apparatus)
31, 310 Storage unit (server apparatus)
32 Network communication unit
40 Control unit (terminal apparatus)
41 Storage unit (terminal apparatus)
42 Operation unit (terminal apparatus)
43 Display unit (terminal apparatus)
60 Area map
65 Process map
71 Steam trap
90, 900 Chart
95 Area map data
96 Process map data

The invention claimed is:

1. A server apparatus that is configured to be applied to a system for managing a process system that includes a plurality of system devices and to be connected to a terminal apparatus via a network line in a manner that enables transmission and reception therebetween, the server apparatus comprising:
a map information storage unit that stores basic arrangement map information for displaying an arrangement map that indicates an arrangement position of at least a specific system device of the plurality of system devices that constitute the process system, and basic process map information for displaying a process map that indicates a connection relationship of the plurality of system devices;
an association information storage unit that stores association information in which identification information of other system devices associated with the specific system device is associated with identification information of the specific system device;
a map information generation unit that generates display arrangement map information and display process map information for switching display of the arrangement map and the process map on a display unit of the terminal apparatus, based on the basic arrangement map information and the basic process map information that are stored in the map information storage unit,
wherein the map information generation unit specifies another system device associated with the specific system device, which is designated via an operation unit of the terminal apparatus on the arrangement map, based on the association information stored in the association information storage unit indicating that an operation efficiency of the another system device is affected by a malfunction of the specific system device, and generates the display process map information for displaying the specified another system device in an identifiable display mode that indicates a type of the another system device on the process map; and
an operation state storage unit that stores information on an operation state of the specific system device in association with the identification information of the specific system device,
wherein the map information generation unit generates the display arrangement map information and the display process map information for displaying each of operation states of the specific system device in a specifiable display mode, based on the information stored in the operation state storage unit,
wherein display of the arrangement map and the process map is switched on the display unit of the terminal apparatus, and
wherein, when display of the arrangement map and the process map is switched on the display unit of the terminal apparatus, the map information generation unit maintains display of the specific system device and the specified another system device associated with the specific system device in the same specifiable display mode on the corresponding display map in accordance with the operation states of the specific system device.

2. The server apparatus according to claim 1, wherein the operation unit of the terminal apparatus accepts an operation input for designating a position in the arrangement map displayed on the display unit, and
the map information generation unit specifies the specific system device designated on the operation unit of the terminal apparatus from position information in the arrangement map transmitted from the terminal apparatus, based on the information stored in the association information storage unit.

3. The server apparatus according to claim 2, wherein the map information generation unit, when the position information in the arrangement map is received, generates the display process map information so as to switch display from the arrangement map that is displayed on the display unit of the terminal apparatus to the process map.

4. The server apparatus according to claim 1, wherein the map information generation unit, when generating the display arrangement map information and the display process map information, changes any one of a shape, a color, and a flashing interval, as the specifiable display mode with which each of the operation states of the specific system device is specifiable, in accordance with the operation states.

5. The server apparatus according to claim 1, wherein the specific system device is a steam trap that discharges drainage generated in the process system, and the operation state storage unit further uses a state determined based on information on a temperature and vibration relating to the steam trap, as information on the operation state of the specific system device.

6. The server apparatus according to claim 5, wherein the operation state storage unit further uses a normal state that indicates a correct operation state, an abnormal state that indicates an abnormal operation state, and an inactive state in which operation has stopped, as the operation states of the specific system device.

7. A system for managing a process system that includes a plurality of system devices, comprising:
a map information storage unit that stores basic arrangement map information for displaying an arrangement map that indicates an arrangement position of at least a specific system device of the plurality of system devices that constitute the process system, and basic process map information for displaying a process map that indicates a connection relationship of the plurality of system devices;
an association information storage unit that stores association information in which identification information of other system devices associated with the specific system device is associated with identification information of the specific system device; and a map information generation unit that generates display arrangement map information for displaying the arrangement map and display process map information for displaying the process map, based on the basic arrangement map information and the basic process map information that are stored in the map information storage unit;

a display unit that switches display of the arrangement map and the process map, using the display arrangement map information and the display process map information; and an operation unit that accepts an operation input for designating one of the specific system devices, wherein the map information generation unit specifies another system device associated with the specific system device designated via the operation unit on the arrangement map, based on the association information stored in the association information storage unit indicating that an operation efficiency of the another system device is affected by a malfunction of the specific system device, and generates the display process map information for displaying the specified another system device in an identifiable display mode that indicates a type of the another system device on the process map; and an operation state storage unit that stores information on an operation state of the specific system device in association with the identification information of the specific system device, wherein the map information generation unit generates the display arrangement map information and the display process map information for displaying each of operation states of the specific system device in a specifiable display mode, based on the information stored in the operation state storage unit, wherein display of the arrangement map and the process map is switched on the display unit of the terminal apparatus, and wherein, when display of the arrangement map and the process map is switched on the display unit of the terminal apparatus, the map information generation unit maintains display of the specific system device and the specified another system device associated with the specific system device in the same specifiable display mode on the corresponding display map in accordance with the operation states of the specific system device.

8. The system for managing a process system according to claim 7, wherein the map information generation unit generates the display arrangement map information and the display process map information by changing any one of a shape, a color, and a flashing interval, as the specifiable display mode with which each of the operation states of the specific system device is specifiable, in accordance with the operation states.

9. A program for managing a process system that causes a computer to function as a server apparatus that is configured to be applied to a system for managing a process system that includes a plurality of system devices and connected to a terminal apparatus via a network line in a manner that enables transmission and reception therebetween, the program causing the computer to function as:

a map information generation unit that generates display arrangement map information and display process map information for switching display of the arrangement map and the process map on a display unit of the terminal apparatus, based on basic arrangement map information for displaying an arrangement map that indicates an arrangement position of at least a specific system device of the plurality of system devices that constitute the process system and basic process map information for displaying a process map that indicates a connection relationship of the plurality of system devices, and causing the map information generation unit to function as a unit that specifies another system device associated with the specific system device, which is designated via an operation unit of the terminal apparatus on the arrangement map, based on association information in which identification information of other system devices associated with the specific system device is associated with identification information of the specific system device indicating that an operation efficiency of the another system device is affected by a malfunction of the specific system device, and generates the process map information for displaying the specified another system device in an identifiable display mode that indicates a type of the another system device on the process map; and an operation state storage unit that stores information on an operation state of the specific system device in association with the identification information of the specific system device, causing the map information generation unit to generate the display arrangement map information and the display process map information for displaying each of operation states of the specific system device in a specifiable display mode, based on the information stored in the operation state storage unit, causing to switch between display of the arrangement map and the process map on the display unit of the terminal apparatus, and causing, when switching between display of the arrangement map and the process map on the display unit of the terminal apparatus, the map information generation unit to maintain display of the specific system device and the specified another system device associated with the specific system device in the same specifiable display mode on the corresponding display map in accordance with the operation states of the specific system device.

10. The program for managing a process system according to claim 9, wherein the map information generation unit is caused to generate the display arrangement map information and the display process map information by changing any one of a shape, a color, and a flashing interval, as the specifiable display mode with which each of the operation states of the specific system device is specifiable, in accordance with the operation states.

11. A method for managing a process system that includes a plurality of system devices that is executed by a computer, the method comprising:

accessing a map information storage unit that stores basic arrangement map information for displaying an arrangement map that indicates an arrangement position of at least a specific system device of the plurality of system devices that constitute the process system, and basic process map information for displaying a process map that indicates a connection relationship of the plurality of system devices;

accessing an association information storage unit that stores association information in which identification information of other system devices associated with the specific system device is associated with identification information of the specific system device;

generating display arrangement map information for displaying the arrangement map and display process map information for displaying the process map, based on the basic arrangement map information and the basic process map information that are stored in the map information storage unit;

switching display of the arrangement map and the process map, using the display arrangement map information and the display process map information;

accepting an operation input for designating one of the specific system devices, wherein generating the display arrangement map information for displaying the arrangement map and the display process map information for displaying the process map includes specifying another system device associated with the specific system device designated via an operation unit on the arrangement map based on the association information stored in the association information storage unit indicating that an operation efficiency of the another system device is affected by a malfunction of the specific system device, and generating the display process map information for displaying the specified another system device in an identifiable display that indicates a type of the another system device mode on the process map;

accessing an operation state storage unit that stores information on an operation state of the specific system device in association with the identification information of the specific system device, wherein generating the display arrangement map information and the display process map information for displaying each of operation states of the specific system device in a specifiable display mode is based on the information stored in the operation state storage unit; and maintaining, when switching display of the arrangement map and the process map, display of the specific system device and the specified another system device associated with the specific system device in the same specifiable display mode on the corresponding display map in accordance with the operation states of the specific system device.

12. The method for managing a process system according to claim 11, wherein generating the display arrangement map information and the display process map information includes changing any one of a shape, a color, and a flashing interval, as the specifiable display mode with which each of the operation states of the specific system device is specifiable, in accordance with the operation states.

13. The method for managing a process system according to claim 12, wherein the display arrangement map specifies from a viewpoint of the other system devices that are affected by the malfunction of a steam trap, that a steam trap whose malfunction affects an operation efficiency of a predetermined number of other system devices should be replaced.

14. The method for managing a process system according to claim 11,
wherein accepting the operation input for designating one of the specific system devices accepts designation of a plurality of system devices simultaneously, and
wherein generating the display arrangement map information for displaying the arrangement map and the display process map information for displaying the process map includes specifying in a specifiable display mode designated system devices by changing a color with which each of the specific system device is specifiable.

* * * * *